United States Patent [19]

Kauser et al.

[11] Patent Number: 5,041,398

[45] Date of Patent: Aug. 20, 1991

[54] METHOD FOR TREATING INCINERATOR ASH

[75] Inventors: Dennis E. Kauser, Millville; Robert A. LaMastro, Pitman, both of N.J.

[73] Assignee: Wheaton Industries, Millville, N.J.

[21] Appl. No.: 314,361

[22] Filed: Feb. 22, 1989

[51] Int. Cl.$^5$ .................................. C03C 6/00
[52] U.S. Cl. ............................. 501/27; 423/92; 423/98; 423/101; 423/104; 423/109; 106/705; 106/DIG. 1
[58] Field of Search ............... 75/25, 101 R, 753, 961; 423/101, 104, 307, 305, 109, 92, 98; 501/27; 106/705, DIG. 1; 65/20

[56] References Cited

U.S. PATENT DOCUMENTS

| | | | |
|---|---|---|---|
| 3,188,201 | 6/1965 | Sontheimer et al. | 75/25 |
| 3,311,447 | 3/1967 | Stuart | 423/101 |
| 3,630,673 | 12/1971 | Mod et al. | 423/593 |
| 4,065,281 | 12/1977 | Byrne | 106/DIG. 1 |
| 4,069,315 | 1/1978 | Wagner et al. | 75/25 |
| 4,191,546 | 3/1980 | Kroyer | 65/20 |
| 4,524,049 | 6/1985 | Sit | 75/101 R |
| 4,678,493 | 7/1987 | Roberts | 65/134 |
| 4,720,295 | 1/1988 | Bronshtein | 501/27 |

FOREIGN PATENT DOCUMENTS 60-165326  8/1985  Japan ........................... 75/25

Primary Examiner—Michael L. Lewis
Assistant Examiner—Steven Bos
Attorney, Agent, or Firm—Ratner & Prestia

[57] ABSTRACT

A process for treatment of incinerator ash typically including heavy metals and both water soluble and insoluble fractions. The insoluble fraction is first removed from the fly ash. The soluble fraction is treated to precipitate heavy metal compounds. Preferably, the heavy metal precipitates are incorporated in a vitrifiable batch. In a separate vitrifiable batch, the insoluble fly ash portions may also be incorporated. Most preferably, bottom ash from the incinerator is also incorporated in a glass batch. The bottom ash glass batch may also incorporate the insoluble fraction from the fly ash.

Precipitation of the heavy metal constituents in the soluble portion of the fly ash is preferably accomplished by raising the pH of the solution, most preferably above 10 by addition of alkali metal or alkaline earth metal hydroxides.

13 Claims, 1 Drawing Sheet

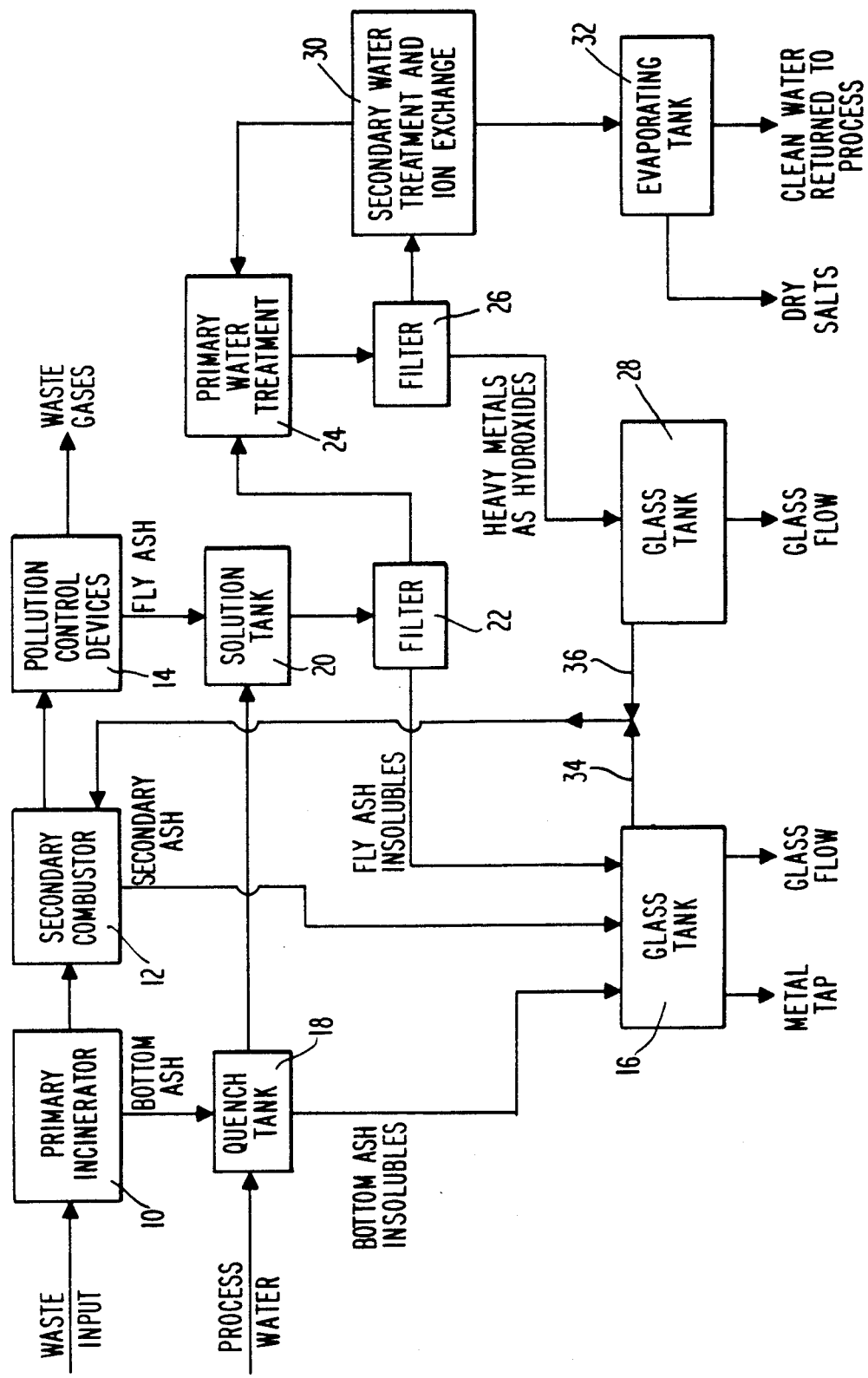

METHOD FOR TREATING INCINERATOR ASH

BACKGROUND OF THE INVENTION

This invention pertains to methods for environmentally acceptable treatment and disposal of incinerator ashes, particularly incinerator fly ashes containing heavy metal and soluble constituents.

Waste incinerators, resource recovery units (RRUs) and certain other types of combustion equipment often produce, as by-products, various types of ash products. The most common of these is bottom ash, which comprises the solid remains of the material incinerated, and fly ash. Fly ash is typically a finely divided ash by-product which escapes with stack gases and is captured by various types of pollution control devices such as a baghouse or an electrostatic precipitator. As the number of ash-producing plants and the amount of ash produced have increased, disposal of this ash has become an increasing problem. Recycling will help reduce the ash problem to a certain extent, but with landfill space at a premium in many states, more RRUs are planned. Thus the ash problem may continue to grow.

An environmentally acceptable method for disposing of these ash by-products is badly needed. This is particularly true as to those ash products, typically fly ashes, which have a significant soluble fraction and heavy metal constituents. The soluble constituents may cause ground water pollution problems. The heavy metals, which are usually also in the soluble fraction, are also considered dangerous ground water pollutants. Many of these heavy metals are toxic or are present in the ash in toxic proportions.

The toxic metals of greatest concern are cadmium and lead, but other metals, such as zinc may become a problem as the metal concentration in the incinerator ash increases. The ash cannot simply be disposed of in a landfill because these concentrations of heavy metals tend to leach and contaminate the surrounding soil or ground water.

Processes have been proposed to fixate or encapsulate the ash, but none have adequately dealt with the high concentration of heavy metals present in waste incinerator ash.

INFORMATION DISCLOSURE STATEMENT

Disposal of fly ash by incorporation in a vitrification batch has been previously suggested in Yamasaki U.S. Pat. No. 4,661,291 and Penberthy U.S. Pat. No. 4,299,611. Neither of the processes disclosed in these patents, however, take into account the presence of the volatile constituents such as chloride, and neither recognize certain inherent impediments in vitrifying heavy metal-containing ashes in the presence of other normally occurring parts of those compositions.

A number of other U.S. patents were studied as background and for their possible relevance to patentability in connection with the preparation of this application, namely:

| | |
|---|---|
| 4,338,200 | Zeijlstra |
| 4,678,493 | Roberts |
| 4,601,832 | Hooykaas |

The relevancy of these references in general is that they pertain to chemical treatments, in some respect similar to some parts of the present process, and, in other cases, treatment (by vitrification) of wastes for disposal purposes.

None, however, suggests the specific constituent separation process of the present invention, nor the relevance of the separation to the ultimate disposal by vitrification, as in the preferred embodiment of the present invention.

SUMMARY OF THE INVENTION

The present invention comprises a method for treating heavy metal-containing fly ash, having soluble and insoluble fractions, by sequentially dissolving the soluble fraction in water, preferably then decreasing the pH of the fly ash-water mixture to below 6, and then separating the insoluble fraction. Heavy metal constituents in the remaining soluble fraction are then converted to insoluble form, preferably by treatment with alkaline earth metal or hydroxide to raise the solution to a pH of 8.5–12.5 (most preferably 10–10.5) and then separating the precipitated heavy metal hydroxides. The separated insoluble fraction of the fly ash and the separately precipitated heavy metal compounds may then be incorporated in separate glass batches (i.e. they may not be incorporated in the same glass batch) for ultimate vitrification. In this manner, the heavy metal compounds are rendered resistant to leaching.

The remaining volatiles, such as chloride compounds, in the solution may subsequently be recovered by evaporating the solution. However, the remaining solution is preferably first treated, such as by ion exchange, to remove residual heavy metal constituents which may then also be incorporated in the heavy metal precipitate vitrification batch.

The initially separated insoluble fraction of the fly ash is preferably incorporated in a vitrifiable batch also including bottom ash. In this manner, all of the ash products are ultimately rendered environmentally safe by incorporation in vitrified masses.

Preferably, the bottom ash and separated insoluble fly ash fraction are incorporated in a batch comprising, by weight, about 10–16% of soda lime cullet, 5–6% aragonite, 2–7% soda ash, and the remainder up to 80% combined bottom ash and separated insoluble fly ash fraction.

Preferably, also, the precipitated heavy metal compounds are incorporated in a glass batch comprising, by weight, 58–62% sand, 0–8% nepheline syenite and/or feldspar, 15–20% soda ash, 0–11% aragonite and/or limestone, and 0–1% sodium nitrate, along with up to 25% precipitated heavy metal compounds.

An important factor in rendering all of these bottom ash and fly ash products vitrifiable is to separate and to incorporate in separate glass batches the insoluble fly ash fraction and the subsequently separated heavy metal compound precipitate. In accordance with the present invention, it has been discovered that failure to do so results in chemical reduction of the otherwise soluble heavy metal compounds by carbonaceous materials in the insoluble fly ash fraction, with resultant loss of the heavy metal compounds from the vitrification batch through volatilization.

For a better understanding of the present invention, reference may be made to the detailed description which follows, taken in conjunction with the sub-joined claims and the accompanying FIGURE, in which:

BRIEF DESCRIPTION OF THE FIGURE

The FIGURE is a schematic diagram of the process, embodying the preferred method of the present invention, for treatment and disposal of both bottom ash and fly ash from a waste incinerator.

DETAILED DESCRIPTION OF THE INVENTION

With reference to the FIGURE, the treatment and disposal process of the present invention pertains to the handling of ash from a waste incinerator, typically including a primary incinerator 10, a secondary combustor 12, and pollution control devices 14. The solid residue from the primary incinerator and secondary combustor, often referred to as bottom ash and secondary ash, are incorporated in a vitrified mass in bottom ash glass tank 16. Preferably, the heavier or bottom ash is first mixed with water in quench tank 18, (the overflow of which is transferred to solution tank 20 and used in another part of the process) and the settled product, referred to as bottom ash insolubles, is passed to bottom ash glass tank 16. Certain constituents of the solid residue from primary incinerator 10 may be separated or otherwise treated before introduction to bottom ash glass tank 16. Apparatus for that purpose may include a grinder, a magnetic separator (for iron removal), or an electromechanical separator (for removal of aluminum, copper, etc.), none of which are shown in the FIGURE.

Often, bottom ash includes metallic wastes which may be tapped directly from bottom ash glass tank 16, in metallic form, and separated from the glass product, as indicated in the separate solid product take-offs at the bottom of bottom ash glass tank 16.

Pollution control devices 14 (which may comprise a baghouse or a electrostatic precipitator, for example) produce fly ash as a solid product. Such fly ash emanating from typical waste incinerators typically includes a soluble fraction and a relatively high proportion of heavy metal compounds (most importantly cadmium, lead and zinc).

In accordance with the present invention, fly ash from pollution control devices 14 is passed to solution tank 20, where, in combination with process water introduced either directly or through quench tank 18, the soluble fraction of the fly ash is dissolved. The soluble and insoluble fractions of the fly ash are then separated in filter 22. Preferably, the fly ash insoluble fraction is disposed of by vitrification, such as by introduction into bottom ash vitrification batch in bottom ash glass tank 16. Filtrate from filter 22, including the soluble fly ash fraction, is passed to a primary water treatment tank 24 where reactants are added to convert the soluble heavy metal constituents into insoluble precipitate.

Preferably, this is accomplished by the addition of alkaline earth metal or alkali metal hydroxides to raise the pH of the solution to 8.5-12.5, most preferably 10-10.5, and thus to precipitate the heavy metal constituents as heavy metal hydroxides which are separated in filter 26.

Alternatively, the reactants introduced in the primary water treatment tank 24 may comprise a soluble phosphate, such as diammonium mono-hydrogen phosphate, to produce a heavy metal phosphate precipitate, which is then separated in filter 26. In this alternative, the pH of the solution in primary water treatment tank 24 is typically adjusted to a range of 8-9. The heavy metal precipitate from filter 26 is preferably disposed of by inclusion in a vitrifiable batch in fly ash glass tank 28. Most importantly, the heavy metal precipitate in filter 26 is vitrified separately from the insoluble fly ash fraction separated in filter 22 in order to avoid reduction of the heavy metal constituents in the fly ash. If reduced, such as by the carbonaceous materials typically found in the fly ash insoluble fraction, the reduced metals would tend to volatize in the subsequent vitrification step.

Both glass tank 16 and fly ash glass tank 28 necessarily include exhaust gas collection devices for environmental safety, and these gases are typically recirculated to secondary incinerator 12, as shown in the schematic diagram. Supernatant liquid in filter 26 is preferably treated by secondary water treatment, such as by ion exchange in tank 30. The residual heavy metals thus separated may be recycled to the process. The remaining liquid product is eluted and passed to evaporating tank 32, where the residual salts, typically sodium chlorides and other light metal chlorides, are recovered, and clean water is returned for process flow.

Although not shown in this schematic diagram, other process steps may also be incorporated. For example, in some cases the waste input to primary incinerator 10 will include substantial amounts of metal products, which may require grinding or shredding. Therefore, as explained previously, a classifier may be introduced between quench tank 18 and bottom ash glass tank 16.

An important feature of the present invention is the vitrification of bottom ash and the insoluble fraction of the fly ash separate from the vitrification of the precipitated heavy metal compounds resulting from conversion of soluble heavy metal compounds in the fly ash. It has been discovered that this is essential to avoid reduction of the heavy metal constituents, by carbonaceous products in the insoluble fly ash fraction, and thus the conversion of the heavy metal compounds into volatile forms which then escape from the system with stack gases or elsewhere.

The composition of mixtures or glass batches in which the bottom ash and insoluble fly ash fraction are incorporated, and the separate glass batch or mixture, in which the heavy metal precipitate from the fly ash is incorporated, must be carefully selected and controlled to ensure that the mixtures, including these waste material by-products, are vitrifiable. The final product may be reused as road base, aggregate, glass cullet, as a raw material for glass building blocks, glass beads, or other glass manufacturing processes. If no other use can be found, this final product may be disposed of, such as in a landfill, and yet be environmentally acceptable in that the remaining heavy metals and other constituents are in a form not likely to be leached and to produce ground water contamination.

For that purpose, the composition range for the mixture including bottom ash and the fly ash insoluble fraction comprises:

| | |
|---|---|
| soda lime cullet | 10-16% |
| aragonite | 5-6% |
| soda ash | 2-7% |
| bottom ash and fly ash insolubles | up to 80% |

Typical glass batch constitutents may be substituted as desired. That is, sand and aragonite may be substituted for processed cullet or limestone may be substituted for the aragonite.

According to the schematic process, this batch composition is continuously fed into bottom ash glass tank 16, by means of a conventional hopper 31, preferably including a vibratory and/or screw feeder. Prior to this addition, glass tank 16 is already filled with an acceptable level of molten glass. As the batch formula is added to the melting chamber, some of the molten glass is removed through the glass drains. The batch addition floats on the surface of the molten glass bath until it is heated sufficiently to melt at which point it is incorporated into the molten bath. Typically, this bath is held at a temperature of at least 2500° F. by means of joule heating, from metal electrodes in the side or bottom of the bath. Preferably, in order to facilitate melting of the bottom ash batch, auxiliary burners are located in the upper portion of bottom ash glass tank 16 for surface heating of the batch.

The bottom of bottom ash glass tank 16 is equipped with a metal tap by which any metals which are liquefied due to the high temperatures of the glass batch, and which are also stratified due to their higher specific gravities, may be removed. This metal may then be purified by any standard method.

The surface temperature of the glass bath may vary from about 300° F. to over 2600° F. and the amount of batch coverage on the bath varies with the feed rate which is dependent on the type of batch used as a starting material as well as the size of the glass tank and capacity of the heaters used. As an example, anywhere from 2 to 30 tons per day may be processed. Still higher process rates could be achieved with larger equipment. Waste heat which escapes from the chamber may be collected and used to preheat air for either the incinerator or glass tank heaters.

The soluble portion of the fly ash is generally composed of chlorides and sulfates, of which the cations are sodium, potassium and heavy metals, i.e., zinc, cadmium and lead. (Most of the heavy metals present in the fly ash are in the form of water soluble salts. High levels of chloride and carbonate cannot be achieved in silicate-based glasses. Therefore, these materials must first be separated before incorporation of associated compounds into a glass batch and subsequent vitrification. Carbonaceous materials generally comprise a significant part of the insoluble fly ash fraction.

Fly ash can typically be added to water at from one-half to eight pounds per gallon. It is this mixture which is then filtered (as in filter 22), and the retentate (filter cake) can be incorporated into the bottom ash. The liquid filtrate then contains much of the heavy metals which were present in the fly ash.

In order to separate these heavy metals, they are precipitated, i.e. converted to insoluble compounds, by the addition of hydroxides of alkali metal or alkaline earth metal or soluble phosphates (as described above).

The composition of the mixture, in which the heavy metal precipitate is incorporated for vitrification, differs from that used for the bottom ash. Necessarily, the constituents in the mixture must be non-reducing, that is there should be no constituents which may tend to reduce the heavy metals in the precipitate. The heavy metal precipitate batch composition range comprises (by weight):

| Sand | 58–62% |
| --- | --- |
| Nepheline Syenite | 0–8% |
| Soda Ash | 15–20% |
| Aragonite | 0–11% |
| Sodium Nitrate | 0–1% |
| Heavy Metal Precipitate | up to 25% |

Soda lime cullet may be used up to 50% as a substitute for the aragonite and nepheline syenite, depending upon the composition of the cullet. Limestone may also be substituted for the aragonite, and feldspar may be used in place of the nepheline syenite. Additionally, other substitutions of similar materials may be possible.

This batch is treated the same way as the bottom ash batch formula for vitrification, with few exceptions; that is, it is added to the surface of a molten glass batch, into which it is incorporated as it melts. The vitrification chamber (i.e., the glass tank) for the fly ash glass batch need not have a drain for liquefied metals resulting from high temperatures in the glass batch. Furthermore, auxiliary burners for surface heating are generally not necessary for the fly ash glass batch. Indeed, it is preferred to limit the fly ash batch surface temperature to below 300° F. to minimize volatilization of heavy metals from the molten glass. The fly ash vitrification chamber, while separate from the bottom ash chamber, is very similar to it. Both the bottom ash and heavy metal precipitate glass tanks are essentially sealed with regard to escaping gases. This is because heavy metal volatiles may escape from the glass batches. These volatiles would escape to the atmosphere if not confined. The gaseous products of the vitrification process may be recovered, condensed and filtered through an appropriate filter such as a baghouse for recycling as fly ash. This may be accomplished by simply sending the escaping gases to secondary combustor 12, via lines 34 and 36, where they will be reprocessed with the fly ash.

The glass resulting from this process is extremely inert with leach rates well below current EPA requirements for hazardous materials.

Since 65 to 80% of the bottom ash batch formula may be raw bottom ash, the increase in weight, realized from the bottom ash vitrification process, may be as little as 25%. This can actually be lower than 20% if a significant amount of molten metal is withdrawn from the vitrification chamber. Furthermore, although an increase in weight is realized, the resulting material will have a higher bulk density and therefore may be of approximately the same volume as the bottom ash starting material.

Fly ash treatment, in accordance with this invention, results in two outflows of material. The outflow related to fly ash insolubles is described above. In the other outflow the dry filter cake (precipitated heavy metal compounds) incorporated in the glass batch and vitrified, is produced at approximately 300–600 pounds per ton of fly ash. This may be fed into the glass batch formula at a rate of up to 25% by weight. Therefore, a final weight of approximately 2 tons of glass is produced for each ton of fly ash processed. Additionally, approximately ½ ton of dry alkali chloride salts are produced. In this example, the final volume of vitrified glass produced is approximately 40% greater than the initial volume of fly ash.

The vitrified material produced in accordance with the present invention is extremely stable. It is not subject to leaching from ground water. Its physical strength is also very good as it is part of a glassy matrix.

The vitrified material may preferably be used in road materials such as asphalt, or as a raw material for commercial grade glass. In such a case, the material is used productively in other products. This material may alternatively be used as landfill, without risk of contamination of surrounding areas.

By way of specific examples of the present invention, the following tables identify different heavy metal and solubles-containing fly ash wastes and some of their characteristic compositions. The tables also show various examples of batch mixture compositions in which incinerator ashes have been incorporated and analyses of resultant products.

Table I shows analyses of the water soluble portions of different fly ash samples from several different sources. The analyses tested for certain specific compounds, and the weight percentages of those compounds in each sample are listed. Samples A, B and C were obtained from an infectious waste incinerator. Samples D and E were obtained from two separate municipal incinerators. Collectively, these samples are believed to be representative of ash products in facilities utilizing baghouses, electrostatic precipitators or conditioning towers. This table also indicates the amount of insolubles found in each sample.

TABLE I

ANALYSIS OF FLY ASH SAMPLES

| | SAMPLE | | | | |
|---|---|---|---|---|---|
| | A | B | C | D | E |
| Soluble Portion | | | | | |
| Chlorine | 35.1% | 37.2% | 40.9% | 21.7% | 10.0% |
| Sodium | 27.9 | 29.9 | 28.8 | 10.2 | 3.3 |
| Potassium | 2.0 | 1.7 | 2.1 | 5.5 | 2.6 |
| Zinc | 2.2 | 2.3 | 2.1 | 4.9 | 4.6 |
| $SO_4$ | 5.5 | * | * | * | * |
| Lead | 50 ppm | 200 ppm | 20 ppm | 20 ppm | 7 ppm |
| Cadmium | 826 ppm | 1190 ppm | 120 ppm | 440 ppm | 700 ppm |
| Manganese | 124 ppm | 119 ppm | * | * | * |
| Copper | 21 ppm | 60 ppm | * | * | * |
| Nickel | 16 ppm | 18 ppm | * | * | * |
| Insolubles | 18.5% | 16.1% | 19.3% | 54.4% | 75.0% |

*(NOT TESTED)

A typical batch of fly ash was obtained from the source of Samples A, B and C to form the basis of several glass batch experiments. This fly ash was treated according to the process of the present invention. Analyses were performed on this fly ash at different stages of the process described herein. Table II shows the results of these analyses. More specifically, Table II shows partial composition analyses of the soluble portion of the sample fly ash before and after addition of NaOH according to the process of the present invention. The table also shows an analysis of the heavy metal-containing precipitate formed by the NaOH addition. The analyses tested only for those compounds reported, and all percentages shown are by weight.

TABLE II

ANALYSIS OF FLY ASH USED FOR EXAMPLES

| | Soluble Portion of Fly Ash | Solubles After NaOH Addition | Filter Cake (insolubles after NaOH Addition) |
|---|---|---|---|
| pH | 6.2 | 10.4 | |
| Chloride | 16.6% | 10.2% | 32.1% |
| Sodium | 9.8% | 6.6% | 23.2% |
| Potassium | 0.65% | 0.70% | 1.11% |
| Zinc | 0.75% | 2.1 ppm | 41.1% |
| Lead | 280 ppm | 2.2 ppm | 4.09% |
| Cadmium | 450 ppm | 3.0 ppm | 1.91% |

Table III shows the results of qualitative spectrographic analysis of the water-insolubles contained in the sample fly ash used in the experiments otherwise reported in Table II.

TABLE III

SPECTROGRAPHIC ANALYSIS OF FILTER CAKE OF FLY ASH INSOLUBLES

| Major | Zn, Na, Pb, Cd, Mg |
|---|---|
| Minor | Ca, K, Cu, Fe, Si |
| Trace | Mn, Ag, Al, Ni, Ti, B |

The sample fly ash (analyzed in Tables II and III) was processed and vitrified according to the process of the present invention. With respect to the metal precipitate formed from the soluble fraction of the fly ash, different compositions within the scope of the present invention were used to form vitrifiable glass batches which were then vitrified, analyzed and tested for chemical stability. The compositions of these batches are shown in Table IV.

TABLE IV

GLASS MELTS USING PROCESSED FLY ASH
(ALL MELTS AT 2600° F. FOR 3 HOURS)

| | EXAMPLE | | | | | | | | |
|---|---|---|---|---|---|---|---|---|---|
| | 1 | 2 | 3 | 4 | 5 | 6 | 7 | 8 | 9 |
| Sand | 938 | 930 | 930 | 938 | 938 | 930 | 930 | 930 | 930 |
| Nepheline Syenite | 124 | 0 | 0 | 124 | 124 | 124 | 124 | 124 | 124 |
| Soda Ash | 288 | 278 | 282 | 288 | 288 | 288 | 288 | 288 | 288 |
| Aragonite | 178 | 178 | 178 | 178 | 151 | 176 | 151 | 126 | 101 |
| Niter | 10 | 10 | 10 | 10 | 10 | 0 | 0 | 0 | 0 |
| Sodium Tripolyphosphate | 0 | 13.5 | 0 | 0 | 0 | 0 | 0 | 0 | 0 |
| Borax | 0 | 0 | 15.9 | 0 | 0 | 15.9 | 15.9 | 15.9 | 15.9 |
| Metal Precipitate from Fly Ash Solubles Fraction | 73 | 73 | 73 | 73 | 100 | 75 | 100 | 125 | 150 |

The analyses tested specifically for the lead, cadmium, zinc and chlorides retained in the vitrified batches. Extraction tests were performed according to the Extraction Procedure (EP) toxicity Test Method and Structural Integrity Test, Method 1310 of the U.S. Environmental Protection Agency. Briefly, this test involves grinding the sample until it passes through a 9.5 mm sieve, and extracting the sample with deionized water maintained at pH of 5±0.2 with acetic acid. The extract is then analyzed and the extract concentrations compared with the maximum extraction limits listed in 40 CFR Part 261.24.

The results of these analyses and extraction tests are reported in Table V. The detection limits for the extraction tests were: cadmium - 50 ppb; lead - 200 ppb; zinc - 50 ppb.

TABLE V

| | EXAMPLES | | | | | | | |
|---|---|---|---|---|---|---|---|---|
| | 1 | 2 | 3 | 4 | 5 | 6 | 7 | 8 |
| Analyzed | | | | | | | | |
| % CdO | 0.05 | 0.05 | 0.07 | 0.11 | 0.08 | 0.05 | 0.06 | 0.10 |
| % ZnO | 0.57 | 0.75 | 0.66 | 2.44 | 1.30 | 2.41 | 2.87 | 3.53 |
| % PbO | 0.26 | 0.20 | 0.24 | 0.29 | 0.15 | 0.59 | 0.70 | 0.85 |
| % Cl | 0.35 | 0.49 | 0.51 | 0.15 | 0.64 | 0.55 | 0.66 | 0.82 |
| Extractions | | | | | | | | |
| Cd | <50 ppb | <50 ppb | <50 ppb | <50 ppb | <50 ppb | NA | NA | <50 ppb |
| Pb | <200 ppb | <200 ppb | <200 ppb | <200 ppb | <200 ppb | NA | NA | <200 ppb |
| Zn | 240 ppb | <50 ppb | <50 ppb | <50 ppb | <50 ppb | NA | NA | <50 ppb |

While this invention has been described with reference to particular variants and embodiments thereof, it is not limited thereto. It is therefore intended that the accompanying claims be construed to encompass the invention in its full scope, and particularly to extend to those equivalent variations and modifications of the invention which may be made by those skilled in the art without departing from the true spirit and scope of the invention.

We claim:

1. A method for treating incinerator fly ash, to separate water insoluble carbonaceous materials, and soluble chlorides, and heavy metals, said method comprising:
   a) mixing said incinerator fly ash with water to form a solution of the water soluble components of said fly ash, including said chlorides and heavy metals;
   b) filtering water insoluble fly ash solids from said solution to remove said water insoluble carbonaceous materials;
   c) precipitating heavy metal compounds from the chloride-containing solution;
   d) separating said precipitated heavy metal compounds from said chloride-containing solution;
   e) incorporating said separated heavy metal compounds in a vitrifiable mixture free of chlorides and carbonaceous materials; and
   f) vitrifying said mixture.

2. The method of claim 1 including, before step (b), the further step of: decreasing the pH of said solution to below 6.

3. The method of claim 1 including the further step of:
   g) incorporating said filtered water insoluble fly ash solids including said carbonaceous materials into a second vitrifiable mixture separate from said mixture produced in step e) and vitrifying said second mixture.

4. The method of claim 3 wherein said second vitrifiable mixture also includes incinerator bottom ash.

5. The method of claim 4 wherein said second mixture comprises, by weight:
   10-16% Soda Lime Cullet
   5-6% Aragonite
   2-7% Soda Ash
   0-80% Bottom Ash and said filtered insoluble fly ash solids including said carbonaceous material.

6. The method of claim 1 wherein step (c) comprises adjusting the pH of said solution to 8.5-12.5.

7. The method of claim 6 wherein the pH of said solution is adjusted to 10-10.5.

8. The method of claim 6 wherein said pH is adjusted by adding alkaline earth metal or alkali metal hydroxide.

9. The method of claim 1 wherein step (c) comprises adjusting the pH of said solution to 8-9 by addition of a water soluble phosphate compound.

10. The method of claim 9 wherein said soluble phosphate compound is diammonium mono-hydrogen phosphate.

11. The method of claim 6 wherein said mixture comprises, by weight:

| | |
|---|---|
| Sand | 58-62% |
| Nepheline Syenite and [/or] Feldspar (combined total) | 0-8% |
| Soda Ash | 15-20% |
| Aragonite and [/or] Limestone (combined total) | 0-11% |
| Sodium Nitrate | 0-1% |
| Said separated heavy metal compounds | [up to] 0-25% |

12. The method of claim 1 further comprising the step of:
   g) treating the separated chloride-containing solution to remove residual heavy metal compounds remaining in said solution, and then evaporating said solution to separate salts from said solution.

13. The method of claim 12 wherein said residual heavy metal compounds removed from said solution in step g) are returned to the process and subsequently incorporated in a vitrifiable mixture and vitrified.

* * * * *